United States Patent [19]
Deschamps et al.

[11] 3,805,261
[45] Apr. 16, 1974

[54] NAVIGATIONAL PROCESS AND DEVICE FOR PATH CONTROL

[75] Inventors: Jacques Desire Deschamps, Saint-Cloud; Andre Adamsbaum, Boulogne-Billancourt, both of France

[73] Assignee: Societe Nationale D'Etude et de Construction de Moteurs D'Aviation, Paris, France

[22] Filed: Feb. 25, 1964

[21] Appl. No.: 347,996

[30] Foreign Application Priority Data
Feb. 27, 1963   France .............................. 63.926258

[52] U.S. Cl.... 343/5 MM, 340/149 R, 343/100 CL, 340/146.3 Q
[51] Int. Cl. ............................................. G01s 9/00
[58] Field of Search .......... 343/5 MM, 5 DP, 100.7; 340/149, 146.3

[56] References Cited
UNITED STATES PATENTS

| | | | |
|---|---|---|---|
| 2,616,983 | 11/1952 | Zworykin et al. ............ | 340/146.3 X |
| 2,932,006 | 4/1960 | Glauberman ...................... | 340/149 |
| 3,025,495 | 3/1962 | Endres ............................. | 340/146.3 |
| 3,103,008 | 9/1963 | Mooney ................... | 343/5 MM UX |
| 2,905,927 | 9/1959 | Reed................................. | 340/149 |
| 2,925,586 | 2/1960 | Levy ............................. | 340/149 X |
| 2,995,727 | 8/1961 | Quade.......................... | 340/149 UX |
| 3,069,079 | 12/1962 | Steinbach et al. ........... | 340/146.3 X |
| 3,113,306 | 12/1963 | Gardner................... | 343/5 MM UX |

*Primary Examiner*—Maynard R. Wilbur
*Assistant Examiner*—G. E. Montone
*Attorney, Agent, or Firm*—Fleit, Gipple & Jacobson

[57] ABSTRACT

A process for controlling the course of a body in motion by comparison of a known relief plot of a surveyed zone with a sounding plot obtained during the passage of the body over said zone, comprising storing a plurality of patterns of binary digits wherein each pattern corresponds to a different and known strip of the said zone, said binary digits being representative of the algebraical sign of the difference in heights between predetermined points of said strip, translating said sounding plot into a pattern of binary digits representative of the algebraical sign of the difference between readings taken in spaced conformity with said predetermined points, and correlating the translated pattern with each of the stored patterns of binary digits and thus obtaining the degree of concordance thereof.

10 Claims, 6 Drawing Figures

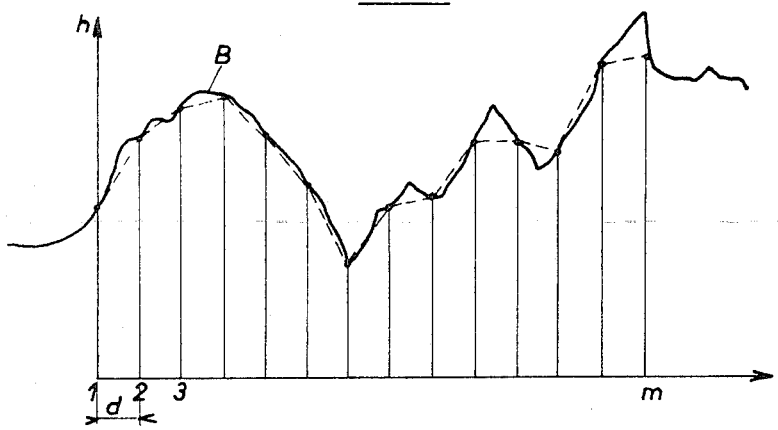
Fig.: 2
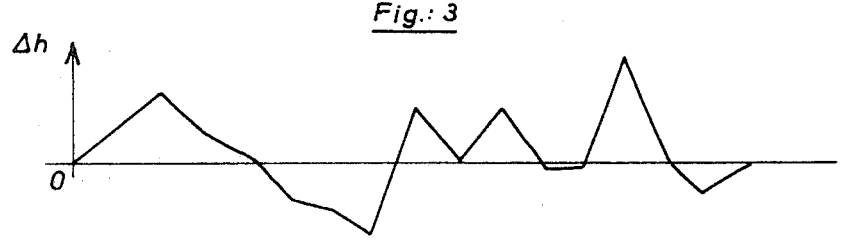
Fig.: 3
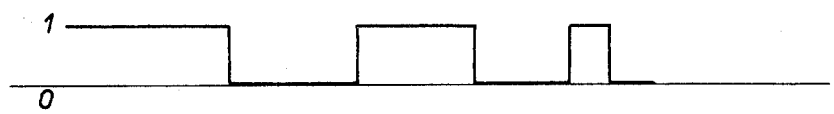
Fig.: 4
Fig.: 5
1 1 1 1 0 0 0 1 1 1 1 0 1 1 0 . . . . . . . .

NAVIGATIONAL PROCESS AND DEVICE FOR PATH CONTROL

Conventional navigational systems are liable to drifts which, if not corrected, result, in a prohibitive divergence between the actual position of the body in motion and its predetermined position. This drawback is particularly acute in the case of inertial navigation systems. It is therefore necessary to effect resetting operations which require an accurate determination of the divergence of the body in motion with respect to the predetermined position.

Such a resetting may be made from a precise knowledge of the relief of a given zone over which the body moves and various proposals have been considered in this connection.

We shall only refer hereafter to missiles or aircraft flying over uneven land, but of course the various explanations given hereafter also apply to submarines effecting long submerged journeys, in which case the reference relief will be that of the bottom of the ocean.

It has already been contemplated to reset air navigation instruments thanks to a prior knowledge of the relief of the zone over which flying takes place, this prior knowledge being put in concrete form by information stored in a "memory," by comparison with real altimetric information supplied for instance by means of a radioaltimeter, during actual flight over the said zone. This resetting method, which would theoretically reduce the magnitude of error, implies however storing complete data of the relevant zone in a memory of very large storage capacity and therefore of important weight and overall dimensions.

An object of the present invention is to allow such a resetting while resorting only to relatively small storage capacity memory, owing to a judicious selection of the nature of the previously recorded information and of the information gathered during flight, as well as to the method of comparison of these two sorts of information.

In accordance with the present invention, the relief data of the selected terrain over which the body is to travel is translated and recorded as sequences of binary information, that is to say in the form of two states or values, 1 and 0, 1 corresponding for example to a positive difference between two consecutive survey data and 0 to a negative difference; similarly the altimetric survey of the land during actual flight is translated and recorded in the form of like binary information. The thus recorded information sequences from the two sources are then compared by a method of correlation.

The correlation of two signals is an operation which consists first in a multiplication of one signal by the other and then in a filtering or integration of the result. According as the correlated signals are perfectly identical or entirely dissimilar, a "correlation rate" equal to 100 percent or 0 is respectively obtained, the more numerous the similarities between the signals, the higher the correlation rate.

In accordance with a preferred embodiment of the present invention, the selected terrain over which the body is to travel is cut out into longitudinal strips — the spacing of which and therefore the number of which depend on the desired accuracy of the resetting — and the relief data of each of these strips is individually recorded in binary form, a set of separate records being thus available in the previously prepared memory ; the correlation of the signals orginating from these various records with those of the altimetric record obtained during flight, allows, by comparing the respective correlation rates, to single out or segregate that one of the fomer records which is closest in similarity to the altimetric record and to determine thus over which strip the missile or aircraft has been actually flying. Knowing the strip over which it should have flown had there been no drift, the magnitude of the lateral path divergence is determinded and the useful correcting controls can thereby be applied.

In a similar manner, it is possible to detect, again by correlating the relevant records, the longitudinal divergence — which is the result of the moving body being slow or fast relatively to the estimates — by determining the longitudinal shift of the corresponding record or, what amounts to the same, the distance between homologous points thereof, for example their point of origin .

Another object of the present invention is to provide an electronic device for carrying out the above course control process. This device comprises basically a first memory which is previously fed with survey data binary information, a second memory fed with altimetric data binary information supplied by an altimeter on board, and a network correlating the binary signals providing from both memories.

In a prefered embodiment of such a device, the first memory is of the magnetic drum type and has a number of recording tracks corresponding to the various longitudinal strips of the selected terrain whereas the second memory is of the balanced trigger circuit type of smaller overall dimensions and storage capacity than the first one and allows reading without erasing in view of repeated use. The correlator may, owing to the binary form of the signals applied to its inputs and providing from both memories, merely be a coincidence circuit composed for instance of diodes followed by an integrator.

In the accompanying drawings:

FIGS. 2 to 5 are explanatory diagrams illustrating one of the basic ideas of the invention.

Figure 1:
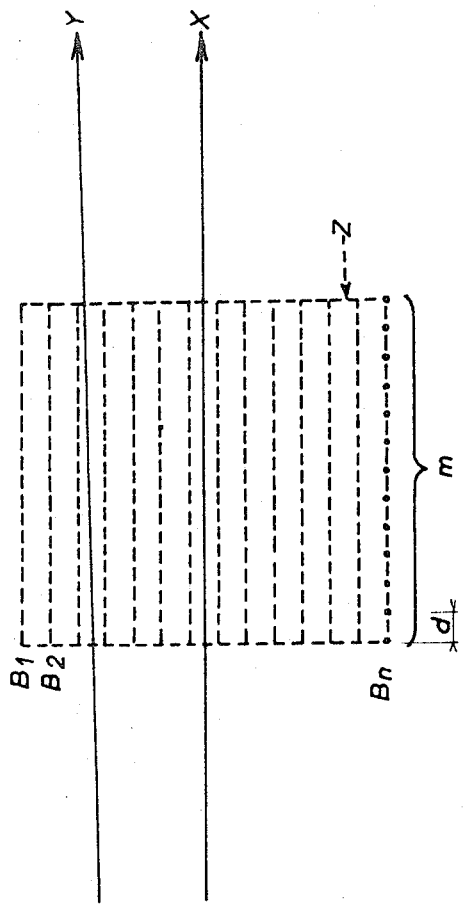
FIG. 1 shows a selected terrain which lies on the path of the missile or aircraft.

On FIG. 1 we have shown in heavy lines on the one hand the prescribed path X or course to be followed and on the other hand the real path Y or course actually followed.

A rectangular land zone Z, the detailed survey of which is known and which extends laterally over a distance sufficient to ensure that the moving body will fly over it taking into account the maximum possible drift of the moving body, is selected on the path of the body and preferably so that its axis coincides with the ideal path X. This zone is cut out longitudinally (i.e., parallel to the prescribed path X) into strips B1, B2. . . Bn, the distance between two consecutive cuts and consequently the number $n$ of cuts depending on the accuracy of the required resetting. By way of example, the following orders of magnitude are given : the zone Z may be a 10kms. × 10kms. square and the strips B 500 meters apart, $n$ being therefore equal to 21.

FIG. 2 shows the contour of one of these longitudinal strips B. The value of the altitude $h$ is taken for a number $m$ of equidistant points of sufficiently narrow interval $d$ for the broken dotted line to coincide substantially with the real contour.

According to an important feature of the invention, these numerical data are not directly used but are rather translated into binary information as follows: the difference $\Delta h$ between two consecutive altitude values is plotted as ordinate (see FIG.3), and the positive or negative sign of this difference is noted, this sign being put in concrete form as an electric condition or state, for example conductive or non-conductive (see FIG.4).

Thus, the relief of the longitudinal strip B concerned will eventually be characterized by a binary pattern having a succession of 0 and 1 digits in a characteristic order (see FIG.5), the various strips B1, B2... Bn having different patterns, which gives finally $n$ patterns for the considered zone Z. Conversely be selecting or singling out a given pattern in this set of $n$ patterns, the corresponding strip B is immediately identified.

These binary data are stored in a memory which is, in an embodiment of the invention, a magnetic drum memory having a plurality of recording tracks for receiving the various above-mentioned patterns.

Figure 6:
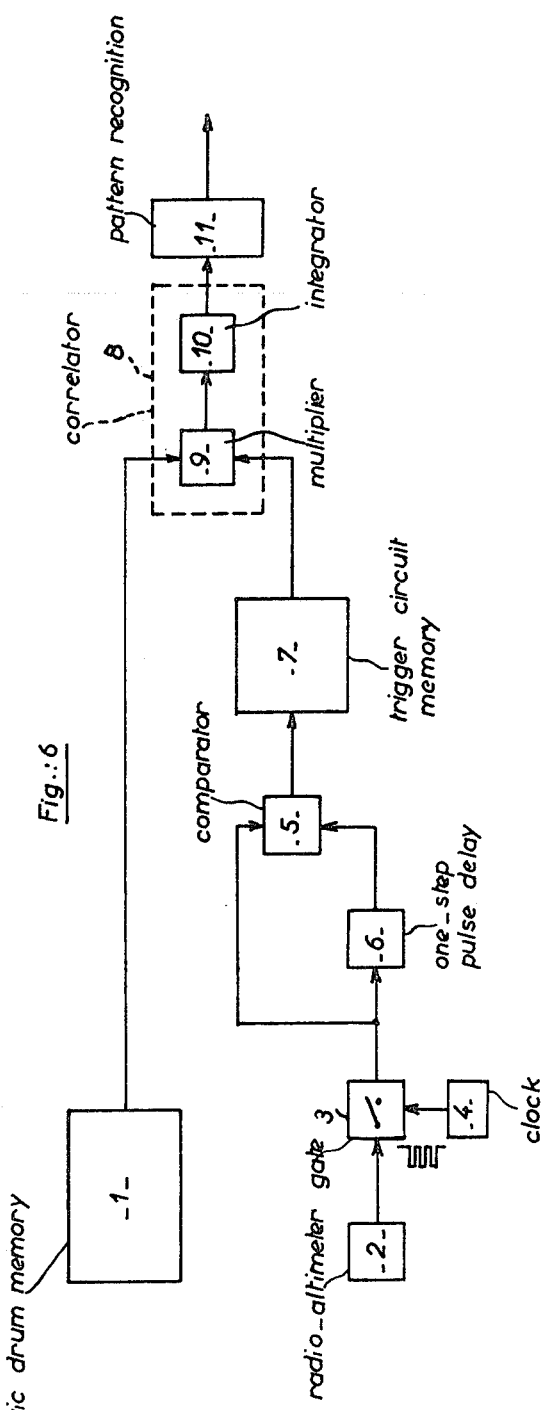
FIG. 6 is a block diagram of an embodiment of the invention.

This memory is shown at 1 in the block diagram of FIG. 6 on which 2 designs an accurate altimeter, for instance a radioaltimeter, adapted to effect a relief survey of the zone Z just under the actual path Y.

As before, this survey is translated into binary information of same interval $d$ as the information previously stored. For this purpose, a gate 3 is fitted at the output side of the radioaltimeter 2 and is connected to a clock 4 supplying a train of control pulses at such a frequency that, taking into account the speed of the body, the time interval between consecutive closures of the gate corresponds to a displacement $d$ of the body. Thus the altimetric signal issuing from 2 and having an outline of the kind illustrated at B in FIG.2, is chopped up into a series of pulses which may be represented by the vertical lines on this same figure.

The $d$-interval soundings taken by the chopper assembly 2-3-4 may conveniently start at the forecast moment when the moving body should enter zone Z. They may end similarly at the forecast moment of its exit therefrom — in this case, the number of altimetric pulses produced will be $m$ — or else as soon as a predetermined number of information is achieved. In either case, a pulse counter (not shown) will stop the sounding operation.

The conversion of these pulses into the binary system may be effected in any convenient encoding unit. For a better understanding, a comparator 5 has been shown on FIG.6, which receives the pulses providing from 3 on the one hand directly and on the other hand through a device 6 which delays said pulses by one period; the comparator 5 is thereby supplied simultaneously with two consecutive pulses of the train of pulses generated by the chopper assembly 2-3-4. According as one of the two pulses thus applied has a higher or lower amplitude than the other, the comparator transmits or does not transmit a signal which is no other than the desired binary signal similar to that illustrated in FIG.4.

This binary altimetric signal is supplied to a memory 7 which is, in accordance with another feature of the present invention, a balanced trigger circuit of smaller storage capacity and overall dimensions than memory 1. This memory 7 must be readily accessible and allow reading without erasing for repeated use.

There are thus available (i) a set of $n$ patterns previously recorded on the tracks of the magnetic drum of memory 1, and (ii) a single pattern newly recorded by the trigger circuits of memory 7. One is thus enabled, at this stage, to search by systematic pattern recognition, among the various patterns of memory 1, that which is identical or closest to the pattern of memory 7. The strip B over which the body was actually flying, i.e., the strip which extends more or less along the projection of path Y, is therefore identified and it will be possible to infer the lateral drift with respect to the ideal path X.

In the above description, we have assumed that the altimetric survey applied in binary form to memory 7 had the same number $m$ of signs recorded therein as each of the prior patterns in memory 1. This is however not at all compulsory and the pattern of memory 7 may have a different number of recorded signs, for example less that $m$.

In such a case, this pattern will be compared with those of memory 1 not only by systematic sampling one by one of the latter, but also by a step-by-step relative shift or motion of translation of each of them, so as to find out its portion which identifies itself with the considered pattern.

It is to be noted that it is thereby possible to determine the longitudinal drift of the body if it is too fast or too slow over the prescribed flight, since the location of the orgin (or the end) of the altimetric survey relatively to the origin (or the end) of the corresponding prior pattern, is known.

Assuming for the sake of simplicity that the altimetric survey is supposed to start at the very instant at which the moving body reaches zone Z and to end at the very instant at which it leaves it (this incidentally implies a number $m$ of recorded signs), but that it has actually started — and therefore ended — a little farther than forecast, a pattern will be obtained which will be shifted rearwardly with respect to the corresponding prior pattern of memory 1. Referring back to the example of FIG.5, an altimetric pattern such as: 100011110110... may be obtained which, comparatively to the illustrated pattern; 111100011110110..., would be shifted by three steps towards the right. Knowing the distance $d$ corresponding to each step, it is inferred that the body is ahead of $3d$ over the expected position.

To sum up, the comparison of the pattern of memory 7 with those of memory 1, both in sampling one by one the latter and shifting step-by-step each of them, leads to an accurate determination of the lateral as well as the longitudinal drifts of the body.

In accordance with the present invention, this comparison is carried out by correlation, similarly to some recent radar systems in which the transmitted signal has to be compared with the signal reflected by a target. (Cf. Adamsbaum patent application Ser. No. 188,920 filed Apr. 6, 1962 and Quiot and Fournier patent application Ser. No. 188,921 filed Apr. 6, 1962).

In FIG. 6, the correlator is shown at 8 and comprises as usual a multiplier 9 followed by an integrator or filter 10. Since the correlator has to treat binary signals of the form 0 or 1, the multiplier 9 may be a mere conventional coincidence circuit composed of diodes. When identical signals: 1 and 1 or 0 and 0, are applied, an output signal 1 is produced; when on the contrary different signals: 1 and 0 or 0 and 1 are applied to the inputs of 9, a 0 signal issues therefrom. The integrator 10 effects a totalisation which expresses the value of the above-defined "correlation rate", that is to say the similarity index of the altimetric pattern of memory 7 with respect to the prior patterns of memory 1.

It is obvious that it is possible, with adequate switching means, to resort to a single correlator 8 or to as many correlators as there are previously recorded patterns in memory 1.

The device is completed by a computing clock constituted by an additional track on the magnetic drum. This clock acts on the altimetric memory 7 so as to start the sequential reading of the information stored therein and to send this information to the various correlators which receive simultaneously the prior recorded information providing from each of the tracks of the drum of memory 1, or to the single correlator which receives successively the said prior recorded information. A trigger computing counter, which receives the pulses from the additional track, shifts the recording tracks by one pitch or step after each correlation.

There is diagrammatically shown at 11 the systematic comparison stage — sometimes called "pattern recognition" stage — which receives the various correlation rates, compares them among each other and eventually determines the land strip over which the moving body actually flew and therealong the precise location of the body at a given instant, as explained above.

What we claim is:

1. A process for controlling the course of a body in motion by comparison of a known relief plot of a surveyed zone with a sounding plot obtained during the passage of the body over said zone, comprising storing a plurality of patterns of binary digits wherein each pattern corresponds to a different and known strip of the said zone, said binary digits being representative of the algebraical sign of the difference in heights between predetermined points of said strip, translating said sounding plot into a pattern of binary digits representative of the algebraical sign of the difference between readings taken in spaced conformity with said predetermined points, and correlating the translated pattern with each of the stored patterns of binary digits and thus obtaining the degree of concordance thereof.

2. The process as set forth in claim 1 wherein said translated sounding plot is obtained by sequentially sensing at predetermined intervals the change of relief in the actual strip of said zone being passed over by said body, and said step of translating comprising producing a bit of digital information corresponding to the sign difference between each said successively sensed change of relief, and wherein the bits of each pattern of stored binary digits correspond to the sign difference between the known changes in relief of corresponding known relief strips.

3. The process as set forth in claim 2 further comprising recording and storing said pattern of binary digits of said sounding plot after the step of translating whereby the binary digits are presented for correlation.

4. The process as set forth in claim 3 wherein said known strips are substantially parallel to the ideal course and are transversely adjacent each other, said step of correlating comprising recognizing the stored pattern of binary digits which most nearly corresponds to the sounded pattern of binary digits and indicating the actual course of the body with respect to the desired course.

5. The process as set forth in claim 4 comprising the additional step of applying to the sounded pattern of binary digits successive stepped phase displacements with respect to each of the stored patterns, said step of correlating through stored pattern recognition indicating both the actual course and true position of the body.

6. An electronic system for controlling the course of a body in motion by comparison of a known relief plot of a surveyed zone with a sounding plot comprising a first memory means programmed with binary information corresponding to the relief data of the known surveyed zone, said binary information being representative of the algebraical sign of the difference in heights between predetermined points of said zone, a second memory means, sounding means on board said body for producing a sounding plot in the form of a pattern of binary digits corresponding to the relief pattern of the strip of said zone actually flown over by said body, said binary digits being representative of the algebraical sign of the difference between readings taken in spaced conformity with said predetermined points and said sounding means feeding the pattern of binary digits to said second memory means, and correlating means connected to the outputs of said first and second memory means for determining the degree of concordance between said pattern of binary digits and the stored binary information.

7. A system as set forth in claim 6 wherein said first memory means is of the magnetic drum type and comprises a number of recording tracks, each track storing a pattern of binary information corresponding to a different strip of said zone.

8. A system as set forth in claim 7 wherein said second memory means is of the trigger circuit type and is adapted to render a continuous binary output without erasing whereby the pattern of binary digits stored therein is presented for correlation.

9. A system as set forth in claim 6 wherein said correlating comprises a multiplier section connected to the outputs of said first and second memory means and an integrator section connected to the output of said multiplier section.

10. A system as set forth in claim 9 wherein a pattern recognition means is connected to the output of said integrator section.

* * * * *